(12) United States Patent
Chen (10) Patent No.: US 11,109,247 B2
(45) Date of Patent: Aug. 31, 2021

(54) BEAM FAILURE RECOVERY METHOD, DEVICE, AND APPARATUS

(71) Applicant: China Academy of Telecommunications Technology, Beijing (CN)

(72) Inventor: Li Chen, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/960,321

(22) PCT Filed: Dec. 18, 2018

(86) PCT No.: PCT/CN2018/121852
§ 371 (c)(1),
(2) Date: Jul. 7, 2020

(87) PCT Pub. No.: WO2019/134506
PCT Pub. Date: Jul. 11, 2019

(65) Prior Publication Data
US 2020/0367079 A1    Nov. 19, 2020

(30) Foreign Application Priority Data

Jan. 8, 2018 (CN) .......................... 201810015242.6

(51) Int. Cl.
*H04W 74/08* (2009.01)
*H04W 48/08* (2009.01)
(Continued)

(52) U.S. Cl.
CPC ........... *H04W 24/04* (2013.01); *H04L 5/0048* (2013.01); *H04W 24/08* (2013.01); *H04W 72/046* (2013.01); *H04W 74/0833* (2013.01)

(58) Field of Classification Search
CPC ..... H04W 76/19; H04W 24/04; H04W 24/08; H04W 72/02; H04W 74/08; H04W 56/00;
(Continued)

(56) References Cited

U.S. PATENT DOCUMENTS

2018/0219604 A1* 8/2018 Lu .............................. H04L 1/12
2019/0141546 A1* 5/2019 Zhou ................. H04W 72/0413
(Continued)

FOREIGN PATENT DOCUMENTS

CN        107079459 A     8/2017
WO     2017024516 A1     2/2017

OTHER PUBLICATIONS

Samsung,"On Bandwidth Part Operation", 3GPP TSG RAN WG1 Meeting #91, Rena, USA, Nov. 27-Dec. 1, 2017, total 5 pages, R1-1720349.
(Continued)

*Primary Examiner* — Edan Orgad
*Assistant Examiner* — Vanneilian Lalchinthang
(74) *Attorney, Agent, or Firm* — Kilpatrick Townsend & Stockton LLP (57) ABSTRACT

Disclosed are a beam failure recovery method, device, and apparatus, comprising: a terminal determining that performing beam failure recovery is required; and the terminal initiating random access to perform the beam failure recovery on a selected bandwidth part, and the bandwidth part is not changed in the random access process. By adopting the present disclosure, a terminal configuring each bandwidth part will not cause a disorderly beam failure recovery process. The terminal can select an appropriate bandwidth part and a synchronization signal block or channel state information reference signal thereon to initiate the beam failure recovery process. The disclosure achieves fast beam recovery while minimizing impact on data transmission.
(Continued)

Further, a base station is also for determining how the terminal performs the beam failure recovery, to make a timely response, to ensure effective transmission of data without wasting random access resources.

11 Claims, 2 Drawing Sheets

(51) Int. Cl.
    *H04W 24/04*     (2009.01)
    *H04L 5/00*     (2006.01)
    *H04W 24/08*     (2009.01)
    *H04W 72/04*     (2009.01)

(58) Field of Classification Search
CPC ... H04B 7/0602; H04B 7/0617; H04L 5/0048; H04L 41/0654
USPC .......................................................... 370/216
See application file for complete search history.

(56) References Cited

U.S. PATENT DOCUMENTS

| | | | |
|---|---|---|---|
| 2019/0166555 A1* | 5/2019 | Cheng | H04W 36/0088 |
| 2019/0182870 A1* | 6/2019 | Shih | H04W 74/004 |
| 2019/0200395 A1* | 6/2019 | Agiwal | H04W 16/32 |
| 2019/0208548 A1* | 7/2019 | Shih | H04W 24/10 |
| 2019/0223227 A1* | 7/2019 | Jiang | H04W 48/16 |
| 2020/0128588 A1* | 4/2020 | Xiong | H04W 74/0833 |
| 2020/0252971 A1* | 8/2020 | Wu | H04W 74/0833 |

OTHER PUBLICATIONS

Qualcomm Incorporated, "Remaining Details on RACH Procedure", 3GPP TSG-RAN WG1 Meeting #91, Reno, Nevada, USA, Nov. 27-Dec. 2, 2017, total 22 pages, R1-1720653.

Ericsson,"BWP and random access", 3GPP TSG-RAN WGI 91, Reno, USA, Nov. 27-Dec. 1, 2017, total 4 pages, RI-1721425.

3GPF TSG-RAN WG2,"LS on BWP related agreements", 3GPF TSG-RAN WG1 Meeting #91,Reno, USA, Nov. 27-Dec. 1, 2017, total 2 pages, R1-1721522; R2-1714049.

Qualcomm Incorporated,"Beam recovery request", 3GPP TSG-RAN WG2 Meeting #99bis, Prague, Czech, gst—Oct. 13, 2017, total 4 pages, R2-1711361.

Catt,"BWP for Beam Failure Recovery", 3GPP TSG-RAN WG2 NR Ad hoc 0118, Vancouver, Canada, Jan. 22-Jan. 26, 2018, total 4 pages, R2-1800160.

3GPP TS 38.321 V15.0.0, 3rd Generation Partnership Project;Technical Specification Group Radio Access Network; NR; Medium Access Control (MAC) protocol specification, Release 15, total 55 pages, Dec. 2017.

Media Tek,"LS to RAN2 on Beam Failure Recovery" 3GPP TSG RAN WG1 Meeting #91, Reno, USA, Nov. 27-Dec. 1, 2017, total 3 pages, R1-1721346.

3GPP TS 38.321 V1,2.0,3rd Generation Partnership Project;Technical Specification Group Radio Access Network;NR Medium Access Control (MAC) protocol specification, Release 15, total 55 pages, Dec. 2017.

Nokia et al.,"Beam Recovery in NR", 3GPP TSG-RAN WG2 #99bis, Prague, Czech Republic, Oct. 9-13, 2017, total 4 pages, R2-1711450(R2-1708677).

Nokia, "Non-synchronized random access procedure", 3GPP TSG RAN WG1 LTE Ad Hoc, Cannes, France, Jun. 27-30, 2006, total 4 pages, R1-061901.

LG Electronics Inc.,"Summary of E-mail discussion on [99bis#43][NRUP/MAC] Impact of BWP", 3GPP TSG-RAN WG2 Meeting #100, Reno, USA, Nov. 27-Dec. 1, 2017, total 11 pages, R2-1713879.

Sesssion Chair (InterDigital),"Report, from L Te and NR User Plane Break-Out Session", 3GPP TSG-RAN WG2 Meeting #100, Reno, USA, Nov. 27-Dec. 1, 2017, total 5 pages, R2-1714117.

* cited by examiner

BEAM FAILURE RECOVERY METHOD, DEVICE, AND APPARATUS

The present application is a national stage application of International Application No. PCT/CN2018/121852, filed on Dec. 28, 2018, which claims the priority from Chinese Patent Application No. 201810015242.6, filed with the Chinese Patent Office on Jan. 8, 2018 and entitled "Beam Failure Recovery Method, Device, and Apparatus", which is hereby incorporated by reference in its entirety.

FIELD

The disclosure relates to the field of wireless communication technologies, and in particular, to a beam failure recovery method, device and apparatus.

BACKGROUND

In the traditional Long Term Evolution (LTE) system, the bandwidth of a cell carrier at a network side is less than or equal to the reception bandwidth of 20 MHz of a user equipment (UE), so the network side always configures the total uplink and downlink bandwidth of a cell for the UE, and the UE may work in the entire bandwidth of the cell carrier.

In the new generation wireless communication system (5G) or Next generation Radio (NR) system, the carrier bandwidth of the network side may be as high as 400 MHz, which is much greater than the receiving capability of the UE. Therefore, the concept of Band Width Part (BWP) is introduced. That is, the large bandwidth of the network side is divided into multiple BWPs, one or more BWPs are allocated to the UE, and a part of the configured BWPs are activated to perform the uplink and downlink transmission for the UE, where the active downlink BWP is called active DL BWP, and the active uplink BWP is called active UL BWP. In the R15 version, for the UE, only one DL BWP and one UL BWP can be activated at one moment, and the inactive BWPs cannot be configured for the uplink and downlink signaling and data transmission.

After the base station configures multiple BWPs for the UE, each BWP is independently configured with various functions and resources. For example, the base station may configure independent random access resources, scheduling request resources, Physical Uplink Control Channels (PUCCHs), semi-persistent schedule (SRS) and the like for different BWPs.

In the NR system, due to the introduction of a high frequency band, the UE and the base station transmit on the determined beams, and there is a correspondence between the receiving and sending beams of the base station and UE. When measuring that the quality of the current working beam channel is poor, the UE needs to initiate a beam failure recovery process, where the beam failure recovery process is implemented through the random access. In one embodiment, the UE selects a specific beam, initiates a random access, and determines that the beam failure recovery is completed on the selected beam after the random access succeeds.

The deficiencies of the related art include: when the network side allocates contention free random access resource to the UE for beam failure recovery, the beam failure recovery process will be chaotic, so that the base station cannot determine how the UE performs the beam failure recovery and cannot respond in time.

SUMMARY

The disclosure provides a beam failure recovery method, device and apparatus, to solve the problem of how the UE selects the reasonable resource to realize the beam failure recovery under the configuration of multiple BWPs.

An embodiment of the disclosure provides a beam failure recovery method, including: determining, by a UE, that beam failure recovery, BFR, is required; performing, by the UE, the BFR by initiating a random access on a selected Band Width Part, BWP, where the BWP is not changed in a random access procedure.

In one embodiment, performing, by the UE, the BFR by initiating the random access on the selected BWP, includes: initiating, by the UE, the random access on an active BWP activated before beam failure, where if there is no contention free random access resource for BFR on the active BWP, the UE performs the BFR by initiating a contention based random access; or initiating, by the UE, the random access on an active BWP activated before beam failure, where if there is contention free random access resource for BFR on the active BWP, the UE performs the BFR by initiating a contention free random access on the active BWP; and if there is no contention free random access resource for BFR on the active BWP, the UE changes the active BWP to a default BWP configured with contention free random access resource and performs the BFR by initiating the random access on the changed default BWP; or selecting, by the UE, a beam on a plurality of configured BWPs according to channel quality, and performing the BFR by initiating the random access on a BWP where the beam is located.

In one embodiment, the default BWP configured with contention free random access resource includes: an initial BWP, or a default BWP, or a BWP configured In one embodiment to perform BFR.

In one embodiment, selecting, by the UE, the beam on the plurality of configured BWPs according to channel quality, includes: performing Synchronization Signal Block, SSB, measurements and/or Channel State Information Reference Signal, CSI-RS, measurements on different BWPs, where different SSBs or CSI-RSs correspond to different beams; selecting a beam configured with contention free random access resource from beams that meet a channel quality requirement, and initiating the random access on a BWP where the beam is located; if none of beams configured with contention free random access resource meets the channel quality requirement, selecting another beam that meets the channel quality requirement, and initiating the random access on a BWP where the beam is located.

In one embodiment, the method further includes: performing, by the UE, the BFR by re-initiating a random access when not receiving a Physical Downlink Control Channel, PDCCH, scheduling command with a Cell-Radio Network Temporary Identifier, C-RNTI, during configured time under a contention free random access or failing to complete contention resolution under a contention based random access.

In one embodiment, performing, by the UE, the BFR by re-initiating a random access, includes: re-initiating the random access by using a BWP and beam of a last initiated random access as well as random access resource, until a maximum quantity of random accesses is reached or a BFR timer expires; or performing a beam quality measurement on a current BWP, re-selecting an SSB or CSI-RS, and re-initiating the random access on the current BWP according to random access configuration under a beam corresponding to the SSB or CSI-RS; or changing to a specific BWP, performing an SSB or CSI-RS measurement on the specific BWP, selecting an SSB or CSI-RS with channel quality higher than a threshold, and re-initiating the random access according to random access configuration under a beam corresponding to the SSB or CSI-RS, where the specific BWP is an initial BWP or a default BWP; or re-selecting an SSB and/or CSI-RS and its corresponding beam according to results of SSB or CSI-RS measurements on a plurality of configured BWPs, and re-initiating the random access according to random access configuration under the beam corresponding to the SSB or CSI-RS, where if the SSB and/or CSI-RS is/are not on a current BWP, the UE re-initiates the random access on a changed BWP where the SSB and/or CSI-RS is/are located.

An embodiment of the disclosure provides a UE, including: a processor configured to read programs in a memory to perform the process of: determining whether beam failure recovery, BFR, is required; a transceiver configured to receive and send data under control of the processor to perform the process of: performing the BFR by initiating a random access on a selected Band Width Part, BWP, when determining that the BFR is required, where the BWP is not changed in a random access procedure.

In one embodiment, performing the BFR by initiating the random access on the selected BWP, includes: initiating the random access on an active BWP activated before beam failure, where if there is no contention free random access resource for BFR on the active BWP, the BFR is performed by initiating a contention based random access; or initiating the random access on an active BWP activated before beam failure, where if there is contention free random access resource for BFR on the active BWP, the BFR is performed by initiating a contention free random access on the active BWP; and if there is no contention free random access resource for BFR on the active BWP, the active BWP is changed to a default BWP configured with contention free random access resource and the BFR is performed by initiating the random access on the changed default BWP; or selecting a beam on a plurality of configured BWPs according to channel quality, and the BFR is performed by initiating the random access on a BWP where the beam is located.

In one embodiment, the default BWP configured with contention free random access resource includes: an initial BWP, or a default BWP, or a BWP configured specially to perform BFR.

In one embodiment, selecting the beam on the plurality of configured BWPs according to channel quality, includes: performing Synchronization Signal Block, SSB, measurements and/or Channel State Information Reference Signal, CSI-RS, measurements on different BWPs, where different SSBs or CSI-RSs correspond to different beams; selecting a beam configured with contention free random access resource from beams that meet a channel quality requirement, and initiating the random access on a BWP where the beam is located; if none of beams configured with contention free random access resource meets the channel quality requirement, selecting another beam that meets the channel quality requirement, and initiating the random access on a BWP where the beam is located.

In one embodiment, the process further includes: performing the BFR by re-initiating a random access when not receiving a Physical Downlink Control Channel, PDCCH, scheduling command with a Cell-Radio Network Temporary Identifier, C-RNTI, during configured time under a contention free random access or failing to complete contention resolution under a contention based random access.

In one embodiment, performing the BFR by re-initiating a random access, includes: re-initiating the random access by using a BWP and beam of a last initiated random access as well as random access resource, until a maximum quantity of random accesses is reached or a BFR timer expires; or performing a beam quality measurement on a current BWP, re-selecting an SSB or CSI-RS, and re-initiating the random access on the current BWP according to random access configuration under a beam corresponding to the SSB or CSI-RS; or changing to a specific BWP, performing an SSB or CSI-RS measurement on the specific BWP, selecting an SSB or CSI-RS with channel quality higher than a threshold, and re-initiating the random access according to random access configuration under a beam corresponding to the SSB or CSI-RS, where the specific BWP is an initial BWP or a default BWP; or re-selecting an SSB and/or CSI-RS and its corresponding beam according to results of SSB or CSI-RS measurements on a plurality of configured BWPs, and re-initiating the random access according to random access configuration under the beam corresponding to the SSB or CSI-RS, where if the SSB and/or CSI-RS is/are not on a current BWP, the random access is re-initiated on a changed BWP where the SSB and/or CSI-RS is/are located.

An embodiment of the disclosure provides a computer readable storage medium storing computer programs configured for performing the above-mentioned method.

An embodiment of the disclosure provides a beam failure recovery device, including: a determining device configured to determine that beam failure recovery, BFR, is required; a recovery device configured to perform the BFR by initiating a random access on a selected Band Width Part, BWP, where the BWP is not changed in a random access procedure.

In the embodiments of the disclosure, the UE initiates the random access on the selected BWP to perform the beam failure recovery, and does not change the BWP during the random access procedure. Since the BWP is not changed during this process, the beam failure recovery process will not be chaotic when the UE configures each BWP. The UE can select the reasonable BWP and the SSB or CSI-RS thereon to initiate the beam failure recovery process. The fast beam recovery may be achieved while the impact on data transmission is minimized.

Further, it also enables the base station to determine how the UE performs the beam failure recovery, so that the base station may respond in time and ensure the efficient data transmission without wasting the random access resources.

BRIEF DESCRIPTION OF THE DRAWINGS

The accompanying drawings illustrated here are used to provide the further understanding of the disclosure and constitute a part of the disclosure, and the schematic embodiments of the disclosure and the illustration thereof are used to explain the disclosure but not limit the disclosure improperly.

DETAILED DESCRIPTION OF THE EMBODIMENTS

The embodiments of the disclosure will be described below in combination with the accompanying drawings in the embodiments of the Embodiments of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the UE includes but not limited to a Mobile Station (MS), a mobile terminal, a mobile telephone, a handset, a portable equipment or the like in the embodiments of the disclosure. This user equipment may communicate with one or more core networks via the Radio Access Network (RAN). For example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the disclosure, the base station (e.g., an access point) may mean a device in an access network communicating with a wireless terminal via one or more sectors over the air interface. The base station may be used to perform the inter-conversion between a received air frame and an IP packet, and used as a router between the wireless terminal and the rest of the access network, where the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the disclosure.

The inventor noticed in the inventive process: in the new-generation wireless communication system (5G or NR system), the concept of BWP is introduced. The carrier bandwidth of a cell can be divided into multiple BWPs. The base station can configure multiple BWPs for the UE. Each BWP is independently configured with various functions and resources. For example, the base station may configure independent random access resources, scheduling request resources, PUCCHs, SRS and the like for different BWPs. The problem of how to select the reasonable resource to realize the beam failure recovery under the configuration of multiple BWPs will occur.

Firstly the BWP will be introduced below in brief

For the BWP, 3GPP also defines some basic concepts.

Initial BWP: a UE that initially accesses can only use the initial BWP to complete the connection establishment process. The initial BWP includes basic cell broadcast signaling and random access resources, etc.

Default BWP: the next generation NodeB (gNB) on the network side can configure a default BWP for the UE in a connected state, and the UE can perform some basic work on the default BWP, such as maintaining the cell connection, performing the cell measurement, initiating a random access, etc.

Configured BWP: the BWP configured by the network side for a single UE in the connected state. Each BWP is independently configured with various layer parameters, such as PUCCH configuration, SPS configuration, Physical Random Access Channel (PRACH) configuration, non-contention access resources used by the Beam Failure Recovery (BFR), etc.

Active BWP: in the BWP configured by the network side for UE, the UE can only use the active BWP for the uplink and downlink transmission. The active BWPs include active DL BWP and active UL BWP. The base station uses the physical layer signaling Downlink Control Indicator (DCI) to explicitly change and activate the BWP. In addition, the BWP-Inactivity Timer (hereinafter referred to as BWP timer) is further introduced. After the BWP timer expires, the UE changes from the active BWP to the default BWP.

Then the random access is introduced in brief as follows.

The random access includes two types: contention based random access and contention free random access. The processes thereof are as follows.

Figure 1:
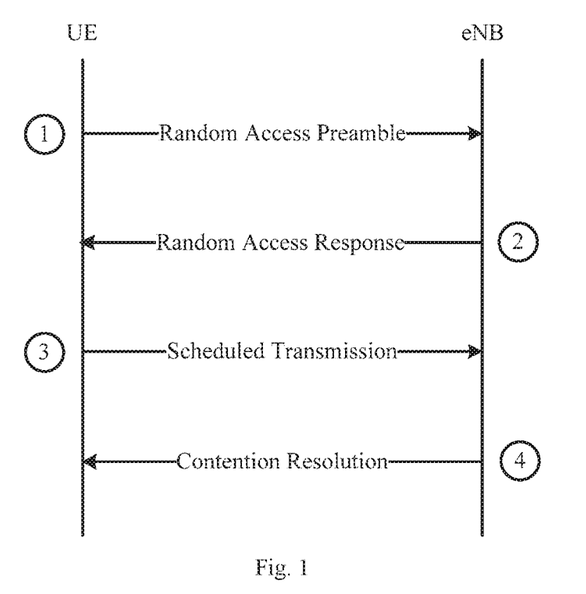
FIG. 1 is a schematic diagram of a contention based random access process in embodiments of the disclosure.

FIG. 1 is a schematic diagram of the contention based random access process, as shown, which mainly includes four steps.

Msg1: a UE selects a random access preamble and a random access resource PRACH, and sends the selected random access preamble to the base station on the selected PRACH resource. In the NR, the particular preamble and/or PRACH resource is/are reserved for the Msg1-based system message request "Msg1 based SI request".

Msg2: the base station receives the random access request Msg1 and sends a random access response to the UE, where the random access response contains the uplink timing advance, the uplink scheduling information (UL grant) of the uplink resource allocated to Msg3, and the temporary Cell-Radio Network Temporary Identifier (C-RNTI) allocated by the network side. The Physical Downlink Control Channel (PDCCH) bearing the Msg2 scheduling message is scrambled with the Random Access-Radio Network Temporary Identifier (RA-RNTI), the Msg2 further carries the preamble ID, and the UE determines that the Msg2 corresponds to the Msg1 sent by it through the RA-RNTI and Preamble ID. In the NR, for the Msg1-based system message request, the Msg2 contains only the preamble ID information corresponding to the Msg1 and has no other content. And for the Msg1-based system message request scenario, the random access procedure ends until the Msg2, that is, if the received Msg2 contains the preamble ID corresponding to the preamble sent by the Msg1, it is considered that the Msg1-based system message request process is completed.

Msg3: the UE sends the uplink transmission on the UL grant specified by the Msg2. The reason of different random accesses is the different content of the Msg3 uplink transmission. For example, for the initial access, the Msg3 transmits a Radio Resource Control (RRC) connection establishment request.

Msg4: contention resolution message, where the UE can determine whether the random access succeeds according to the Msg4. For the UE that initially accesses, the temporary C-RNTI is automatically converted into the unique UE identifier (C-RNTI) of the UE in the cell after the contention resolution succeeds.

Figure 2:
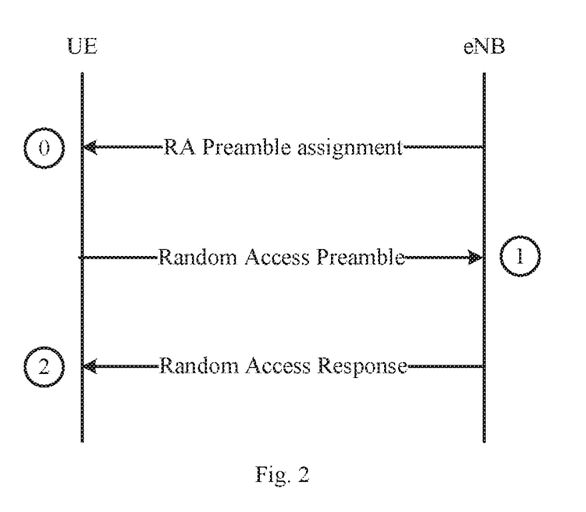
FIG. 2 is a schematic diagram of a contention free random access process in embodiments of the disclosure.

FIG. 2 is a schematic diagram of the contention free random access process, as shown, which is mainly divided into three steps.

Msg0: the base station allocates a dedicated preamble for the contention free random access as well as the PRACH resource used by the random access to a UE.

Msg1: the UE sends the specified dedicated preamble to the base station on the specified PRACH resource according to the instruction of the Msg0. After receiving the Msg1, the base station calculates the uplink Timing Advance (TA) according to the Msg1.

Msg2: the base station sends a random access response to the UE. In most random access scenarios, the format of the random access response is the same as that of the contention based random access, and the PDCCH with the RA-RNTI is used to schedule the Media Access Control Random Access Response Protocol Data Unit (MAC RAR PDU) that contains the Random Access Preamble ID (RAPID), the Time Alignment Command (TAC) of the timing advance information, and the subsequent uplink transmission resource allocation UL grant. The UE completes the contention resolution through the RAPID in the random access response MAC RAR being the same as the preamble code sent by the Msg1.

The NR further introduces a new contention free random access scenario: Beam Failure Recovery BFR. In this scenario, the Msg2 is a PDCCH carrying the C-RNTI. Mainly, the C-RNTI is consistent with the C-RNTI of the UE, and the UE judges that the random access succeeds, and thus the beam failure recovery succeeds.

In the NR system, due to the introduction of a high frequency band, the UE and the base station transmit on the determined beams, and there is a correspondence between the receiving and sending beams of the base station and UE. When the UE measures the poor quality of the current working beam channel, it needs to initiate a beam failure recovery process, which is implemented through the random access. In one embodiment, the UE selects a specific beam, initiates a random access, and considers that the beam failure recovery is completed on the selected beam after the random access succeeds. The network side allocates the non-contention access resources (PRACH resources and/or preamble codes) to the UE on a plurality of beams. If there are contention free random access resources on the beam selected by the UE, the contention free random access is initiated. After receiving the Msg1, the UE receives the PDCCH command scrambled with the C-RNTI of the UE within the configured time, and then considers that the contention free random access succeeds. If no contention free random access resource is allocated on the beam selected by the UE, the UE performs the beam failure recovery by way of the contention based random access. The contention free random access resources for the beam failure recovery are allocated independently on different BWPs. The beam recovery means that the UE re-finds a beam of which the channel quality meets the requirement. In one embodiment, the UE selects a new Synchronization Signal Block (SSB) or Channel State Information Reference Signal (CSI-RS), where different SSBs or CSI-RSs correspond to different beams. In the description of the present application, selecting the beam is equivalent to selecting the SSB or CSI-RS.

The deficiencies of the related art also include: if the network side allocates the contention free random access resources to the UE for the beam failure recovery, but no contention free random access resource is allocated on the active BWPs of the UE, the current mechanism does not specify the UE behavior in this state. This will cause the confusion of the beam failure recovery process when the UE configures the BWPs, and the base station does not determine how the UE performs the beam failure recovery, cannot respond in time, and cannot ensure the effective data transmission while wasting the random access resources.

Based on this, the embodiments of the disclosure provide a scheme for the beam failure recovery, to solve the problem of how the UE selects the reasonable resource to realize the beam failure recovery under the configuration of multiple BWPs.

The specific embodiments of the disclosure will be illustrated below in combination with the drawings.

In the description process, only the UE-side behavior will be described, and the base station side only needs to perform the random access procedure corresponding to the UE-side process.

Figure 3:
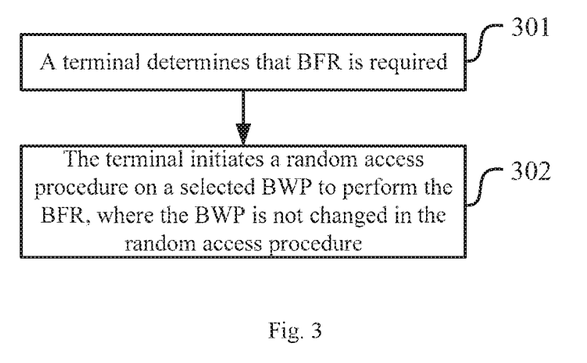
FIG. 3 is a schematic diagram of an implementation process of a beam failure recovery method in embodiments of the disclosure.

FIG. 3 is a schematic diagram of an implementation process of a beam failure recovery method, and as shown, the method includes the following steps.

Step 301: a UE determines that the beam failure recovery is required.

Step 302: the UE initiates a random access on a selected BWP to perform the beam failure recovery. The BWP is not changed in the random access procedure.

In one embodiment, the UE initiates the random access on the selected BWP to perform the beam failure recovery, where the BWP is not changed in the random access procedure.

In an implementation, the UE initiates the random access on the selected BWP to perform the beam failure recovery, including the following three modes.

1. The UE initiates a random access on an active BWP activated before the beam failure, where if there is no contention free random access resource for BFR on the active BWP, a contention based random access is initiated to perform the beam failure recovery.

In one embodiment, the UE initiates the random access on the BWP activated before the beam failure, where if there is no contention free random access resource for BFR on the active BWP, the contention based random access is initiated to perform the beam failure recovery.

2. The UE initiates a random access on an active BWP activated before the beam failure, where if there is contention free random access resource for BFR on the active BWP, the UE initiates a contention free random access on the active BWP to perform the beam failure recovery; if there is no contention free random access resource for BFR on the active BWP, a random access is initiated on the changed default BWP configured with the contention free random access resource to perform the beam failure recovery.

In an implementation, the default BWP configured with the contention free random access resource may be: an initial BWP, or a default BWP, or a BWP configured specially to perform the BFR.

In one embodiment, the UE judges whether there is contention free random access resource for BFR on the BWP activated before the beam failure; if there is contention free random access resource for BFR on the BWP activated before the beam failure, UE initiates the contention free random access on the active BWP to perform the beam failure recovery; if there is no contention free random access resource for BFR on the BWP activated before the beam failure, the random access is initiated on the changed default BWP configured with the contention free random access resource to perform the beam failure recovery, where the default BWP configured with the contention free random access resource may be: an initial BWP, or a default BWP, or a BWP configured specially to perform the BFR.

3. The UE selects a beam on a plurality of configured BWPs according to the channel quality, and initiates a random access on the BWP where the beam is located to perform the beam failure recovery.

In an implementation, the UE selects the beam on the plurality of configured BWPs according to the channel quality, which may include: performing the SSB measurements and/or CSI-RS measurements on different BWPs, where different SSBs or CSI-RSs correspond to different beams; and selecting a beam configured with contention free random access resource from beams that meet a channel quality requirement, and initiating the random access on a BWP where the beam is located; if none of the beams configured with contention free random access resource meets the channel quality requirement, selecting another beam that meets the channel quality requirement, and initiating the random access on a BWP where the beam is located.

In one embodiment, the UE selects a beam with good-enough channel quality on a plurality of configured BWPs, and initiates the random access on the BWP corresponding to the beam to perform the beam failure recovery. The way in which the UE selects a beam with good-enough channel quality may be: the SSB measurements and/or CSI-RS measurements are performed on different BWPs. In the NR system, different SSBs or CSI-RSs correspond to different beams; and a beam configured with contention free random access resource is selected from the beams meeting the channel quality requirement (for example, greater than the set channel quality threshold) and a random access is initiated on the BWP where this beam is located. If none of the beams configured with contention free random access resource meets the channel quality requirement, another beam that meets the channel quality requirement is selected, and a random access is initiated on the BWP where this beam is located.

One random access failure means that the UE does not receive the PDCCH scheduling command with the C-RNTI during the configured time under the contention free random access, or fails to complete the contention resolution under the contention based random access. For the case of the UE after one random access fails, the "configured time" in the sentence that the UE receives the PDCCH scheduling command with the C-RNTI during the configured time under the contention free random access refers to the prescribed time for receiving the random access response of the base station, and is generally the length of the receiving window of the random access response.

In an implementation, the method may further include: the UE re-initiates a random access to perform the BFR when not receiving a PDCCH scheduling command with a C-RNTI during the configured time under the contention free random access or failing to complete the contention resolution under the contention based random access.

In an implementation, after one random access fails, the UE may re-initiate a random access for BFR in the following ways.

1. Re-initiating a random access by using a BWP and beam of a last initiated random access as well as random access resource, until the maximum number of random accesses is reached or the BFR timer expires.

In one embodiment, after one random access fails, the UE re-initiates a random access by using the BWP and beam (represented as SSB or CSI-RS) of the last initiated random access as well as random access resources, until the maximum number of random accesses is reached or the BFR timer expires.

2. Performing a beam quality measurement on the current BWP, re-selecting an SSB or CSI-RS, and re-initiating the random access on the current BWP according to the random access configuration under a beam corresponding to the SSB or CSI-RS.

In one embodiment, after one random access fails, the UE performs the beam quality measurement on the current BWP, re-selects an SSB or CSI-RS, and re-initiates the random access on the current BWP according to the random access configuration under the beam corresponding to the SSB or CSI-RS.

3. Changing to a specific BWP, performing the SSB or CSI-RS measurement on the specific BWP, selecting an SSB or CSI-RS with channel quality higher than a threshold, and re-initiating the random access according to the random access configuration under a beam corresponding to the SSB or CSI-RS, where the specific BWP is an initial BWP or default BWP.

In one embodiment, after one random access fails, the UE changes to the specific BWP, performs the SSB or CSI-RS measurement on the BWP, selects an SSB or CSI-RS with channel quality higher than the threshold, and re-initiates the random access according to the random access configuration under the beam corresponding to the SSB or CSI-RS, where the specific BWP is the initial BWP or default BWP.

4. Re-selecting an SSB and/or CSI-RS and its corresponding beam according to the results of the SSB or CSI-RS measurements on a plurality of configured BWPs, and re-initiating the random access according to the random access configuration under the beam corresponding to the SSB or CSI-RS, where if the SSB and/or CSI-RS is/are not on a current BWP, the UE re-initiates the random access on the changed BWP where the SSB and/or CSI-RS is/are located.

In one embodiment, after one random access fails, the UE re-selects an SSB and/or CSI-RS and its corresponding beam according to the results of the SSB or CSI-RS measurements on a plurality of configured BWPs, and re-initiates a random access according to the random access configuration under the beam corresponding to the SSB or CSI-RS. If the SSB and/or CSI-RS is/are not on the current BWP, the UE needs to change to the BWP where the SSB and/or CSI-RS is/are located.

The illustration is performed below by way of examples. The following embodiments only describe the UE-side behavior, and the base station side may perform the random access procedure corresponding to the UE-side process.

First Embodiment

In this embodiment, the UE performs the BFR only on the currently active BWP.

UE side.

Step 1: the UE detects the beam failure.

Step 2: the UE performs the SSB and/or CSI-RS measurement only on the BWP activated before the beam failure is discovered.

Step 3: when the SSB and/or CSI-RS meeting the channel quality requirement is/are detected, a random access is initiated on its corresponding beam, including: one beam is selected from the beams meeting the channel quality requirement; if there is a beam configured with contention free random access resource in the beams meeting the channel quality requirement, this type of beam is selected, and a random access is initiated by using the contention free random access process on the selected beam to perform the BFR; if none of the beams meeting the channel quality requirement is configured with contention free random access resource, or no contention free random access resource for the BFR is configured on the BWP, the contention based random access is initiated to perform the BFR.

In this random access procedure, the UE does not change the BWP.

Second Embodiment

In this embodiment, the UE performs the BFR on the specific BWP that can perform the BFR.

UE side.

Step 1: the UE detects the beam failure.

Step 2: the UE performs the SSB and/or CSI-RS measurement on the BWP activated before the beam failure is discovered.

Step 3: if no beam meeting the channel quality requirement is detected or none of the beams meeting the channel quality requirement is configured with contention free random access resource for the BFR, the UE changes to the default BWP configured with contention free random access resource, where this BWP may be the initial BWP, or the default BWP, or the BWP configured specially to perform the BFR.

Step 4: the SSB and/or CSI-RS measurement is performed on the changed BWP.

Step 5: when the SSB and/or CSI-RS meeting the channel quality requirement is/are detected, a random access is initiated on its corresponding beam, including: one beam is selected from the beams meeting the channel quality requirement; if there is a beam configured with contention free random access resource in the beams meeting the channel quality requirement, this type of beam is selected, and a random access is initiated by using the contention free random access process on the selected beam to perform the BFR; if none of the beams meeting the channel quality requirement is configured with contention free random access resource, the contention based random access is initiated to perform the BFR.

Third Embodiment

In this embodiment, the UE selects a BWP to perform the BFR by measuring on all the configured BWPs.

UE side.

Step 1: the UE detects the beam failure.

Step 2: the UE performs the SSB and/or CSI-RS measurements on a plurality of configured BWPs.

Step 3: the UE screens all the measurement results, selects the SSBs and/or CSI-RSs meeting the channel quality requirement and their corresponding beams, where the beam configured with contention free random access resource is preferentially selected, and if there is no such beam, the beam that is not configured with contention free random access resource is selected.

Step 4: the UE changes to the BWP where the selected SSB and/or CSI-RS is/are located, and initiates a random access on its beam, including: if this beam is configured with contention free random access resource, the UE initiates a contention free random access to perform the BFR; if this beam is not configured with contention free random access resource, the UE initiates a contention based random access to perform the BFR.

Fourth Embodiment

In this embodiment, after one random access fails, the UE re-initiates a random access on the beam of the current BWP to perform the BFR.

UE side.

Step 1: the UE initiates a random access to perform the BFR, but this random access fails.

Step 2: the UE re-initiates a random access on the BWP and beam (SSB or CSI-RS) where the last random access was initiated, where if the last was the contention free random access, one contention free random access resource is selected from the contention free random access resources corresponding to the SSB or CSI-RS to initiate a contention free random access at this time; and if the last was the contention based random access, a contention based random access is initiated on the beam corresponding to the SSB or CSI-RS at this time.

Fifth Embodiment

In this embodiment, after one random access fails, the UE re-selects a beam on the current BWP to initiate a random access perform the BFR.

UE side.

Step 1: the UE initiates a random access to perform the BFR, but this random access fails.

Step 2: the UE re-selects the SSB or CSI-RS meeting the channel quality requirement on the BWP where the last random access was initiated, preferentially selects the SSB or CSI-RS configured with contention free random access resource, and re-initiates a random access to perform the BFR.

Sixth Embodiment

In this embodiment, the UE changes to a designated BWP to initiate a random access.

UE side.

Step 1: the UE initiates a random access to perform the BFR, but this random access fails.

Step 2: the UE changes to the designated BWP, which is the initial BWP or the default BWP.

Step 3: the UE performs the SSB or CSI-RS measurement on the BWP, selects an SSB or CSI-RS with the channel quality higher than the threshold, and re-initiates a random access according to the random access configuration corresponding to the SSB or CSI-RS.

Seventh Embodiment

In this embodiment, the UE selects an SSB or CSI-RS to initiate a random access according to the measurement results on a plurality of configured BWPs.

UE side.

Step 1: the UE initiates a random access to perform the BFR, but this random access fails.

Step 2: the UE evaluates the measurement results of the SSBs or CSI-RSs on a plurality of configured BWPs, and selects an SSB or CSI-RS with the channel quality higher than the threshold.

Step 3: if the SSB or CSI-RS is not on the current BWP, the BWP is changed, and a random access is initiated on the random access resource corresponding to the SSB or CSI-RS.

Based upon the same inventive concept, the embodiments of the disclosure further provide UE, a computer readable storage medium, and a beam failure recovery device. Since the principle solving the problem of these devices is similar to the beam failure recovery method, the implementations of these devices may refer to the implementations of the method, and the repeated description thereof will be omitted here.

When the embodiments of the disclosure is implemented, it may be implemented in such way as follows.

Figure 4:
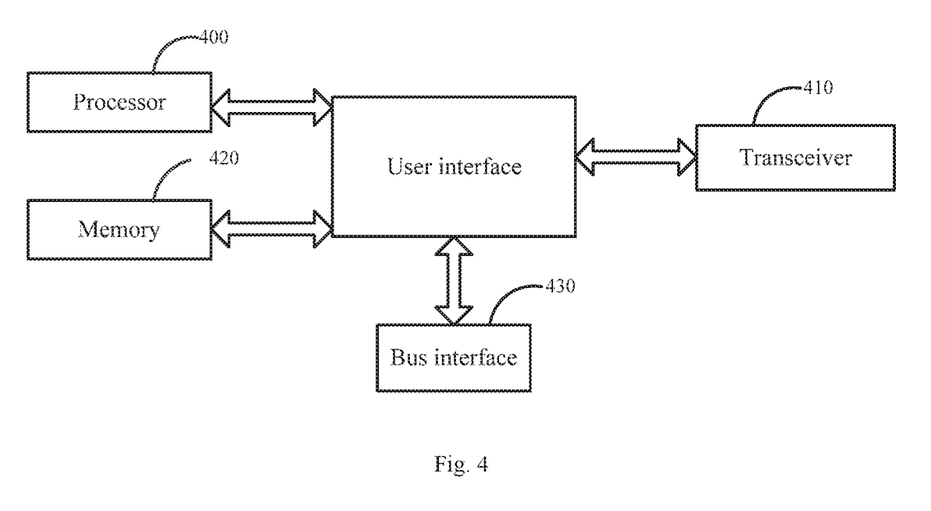
FIG. 4 is a structural schematic diagram of UE in embodiments of the disclosure.

FIG. 4 is a structural schematic diagram of a UE, and as shown, the UE includes: a processor 400 configured to read programs in a memory 420 to perform the process of: determining whether BFR is required; a transceiver 410 configured to receive and send data under the control of the processor 400 to perform the process of: performing the BFR by initiating a random access on a selected BWP when determining that the BFR is required, where the BWP is not changed in a random access procedure.

In an implementation, performing the BFR by initiating the random access on the selected BWP includes: initiating the random access on an active BWP activated before beam failure, where if there is no contention free random access resource for BFR on the active BWP, the BFR is performed by initiating a contention based random access; or initiating the random access on an active BWP activated before beam failure, where if there is contention free random access resource for BFR on the active BWP, the BFR is performed by initiating a contention free random access on the active BWP; and if there is no contention free random access resource for BFR on the active BWP, the active BWP is changed to a default BWP configured with contention free random access resource and the BFR is performed by initiating the random access on the changed default BWP; or selecting a beam on a plurality of configured BWPs according to channel quality, and the BFR is performed by initiating the random access on a BWP where the beam is located.

In an implementation, the default BWP configured with contention free random access resource includes: an initial BWP, or a default BWP, or a BWP configured specially to perform the BFR.

In an implementation, selecting the beam on the plurality of configured BWPs according to the channel quality includes: performing the SSB measurements and/or CSI-RS measurements on different BWPs, where different SSBs or CSI-RSs correspond to different beams; selecting a beam configured with contention free random access resource from the beams that meet the channel quality requirement, and initiating a random access on a BWP where the beam is located; if none of beams configured with contention free random access resource meets the channel quality requirement, selecting another beam that meets the channel quality requirement, and initiating a random access on a BWP where the beam is located.

In an implementation, the process further includes: performing the BFR by re-initiating a random access when not receiving a PDCCH scheduling command with a C-RNTI during the configured time under the contention free random access or failing to complete the contention resolution under the contention based random access.

In an implementation, performing the BFR by re-initiating a random access includes: re-initiating the random access by using a BWP and beam of a last initiated random access as well as random access resource, until the maximum number of random accesses is reached or a BFR timer expires; or performing the beam quality measurement on the current BWP, re-selecting an SSB or CSI-RS, and re-initiating the random access on the current BWP according to random access configuration under a beam corresponding to the SSB or CSI-RS; or changing to a specific BWP, performing the SSB or CSI-RS measurement on the specific BWP, selecting an SSB or CSI-RS with channel quality higher than a threshold, and re-initiating the random access according to the random access configuration under a beam corresponding to the SSB or CSI-RS, where the specific BWP is an initial BWP or a default BWP; or re-selecting an SSB and/or CSI-RS and its corresponding beam according to results of SSB or CSI-RS measurements on a plurality of configured BWPs, and re-initiating the random access according to the random access configuration under the beam corresponding to the SSB or CSI-RS, where if the SSB and/or CSI-RS is/are not on a current BWP, the random access is re-initiated on a changed BWP where the SSB and/or CSI-RS is/are located.

Here, in FIG. 4, the bus architecture may include any numbers of interconnected buses and bridges, and In one embodiment link various circuits of one or more processors represented by the processor 400 and the memory represented by the memory 420. The bus architecture may further link various other circuits such as peripheral device, voltage regulator and power management circuit, which are all well known in the art and thus will not be further described again herein. The bus interface provides an interface. The transceiver 410 may be a plurality of elements, i.e., include a transmitter and a receiver, and provide the units for communicating with various other devices over the transmission media. For different UEs, the user interface 430 may also be the interface for inter-connecting or exter-connecting with the required devices, and the connected devices include but not limited to keypad, display, loudspeaker, microphone, joystick and the like.

The processor 400 is responsible for managing the bus architecture and general processing, and the memory 420 may store the data used by the processor 400 when performing the operations.

An embodiment of the disclosure further provides a computer readable storage medium storing a computer program that performs the beam failure recovery method described above. The details may refer to the implementations of the UE.

An embodiment of the disclosure further provides a beam failure recovery device, including: a determining device configured to determine that BFR is required; a recovery device configured to perform the BFR by initiating a random access on a selected BWP, where the BWP is not changed in a random access procedure.

For the sake of description, all the parts of the above-mentioned device are divided into various devices or units by function, which are described respectively. Of course, the functions of the various devices or units may be implemented in the same one or more software or hardware when the disclosure is implemented.

In summary, in the embodiments of the disclosure, the terminal initiates the random access on the selected BWP to perform the beam failure recovery, and does not change the BWP during the random access procedure. Through this solution, the terminal can select the reasonable BWP and the SSB or CSI-RS thereon to initiate the beam failure recovery process. The fast beam recovery may be achieved while the impact on data transmission is minimized.

Embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions.

These computer program instructions can also be stored in a computer readable memory which is for of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A beam failure recovery method, comprising:
   determining, by a user equipment (UE), that beam failure recovery (BFR) is required; and
   performing, by the UE, the BFR by initiating a random access procedure on a selected Band Width Part (BWP), wherein the BWP is not changed in the random access procedure;
   wherein said performing, by the UE, the BFR by initiating the random access procedure on the selected BWP, comprises:
   selecting, by the UE, a beam according to channel quality on a plurality of configured BWPs, and performing the BFR by initiating the random access procedure on a BWP where the beam is located;
      wherein said selecting, by the UE, the beam according to channel quality on the plurality of configured BWPs, comprises:
      performing measurements on Synchronization Signal Blocks (SSBs) and/or Channel State Information Reference Signals (CSI-RSs) on the plurality of configured BWPs, wherein different SSBs or CSI-RSs correspond to different beams; and
      selecting a beam configured with contention free random access resource from beams that meet a channel quality requirement, and initiating the random access procedure on a BWP where the beam is located; when none of beams configured with contention free random access resource meets the channel quality requirement, selecting another beam that meets the channel quality requirement, and initiating the random access procedure on a BWP where the another beam is located.

2. The method according to claim 1, wherein said performing, by the UE, the BFR by initiating the random access procedure on the selected BWP, further comprises:
   initiating, by the UE, the random access procedure on an active BWP activated before beam failure, wherein when there is no contention free random access resource for BFR on the active BWP, the UE performs the BFR by initiating a contention based random access procedure; or
   initiating, by the UE, the random access procedure on an active BWP activated before beam failure, wherein when there is contention free random access resource for BFR on the active BWP, the UE performs the BFR by initiating a contention free random access procedure on the active BWP; and when there is no contention free random access resource for BFR on the active BWP, the UE changes the active BWP to a default BWP configured with contention free random access resource and performs the BFR by initiating the random access procedure on the changed default BWP.

3. The method according to claim 2, wherein the default BWP configured with contention free random access resource comprises: an initial BWP, or a default BWP, or a BWP configured specially to perform BFR.

4. The method according to claim 1, further comprising:
   performing, by the UE, the BFR by re-initiating a random access procedure when not receiving a Physical Downlink Control Channel (PDCCH) scheduling command with a Cell-Radio Network Temporary Identifier (C-RNTI) during configured time under a contention free random access procedure or failing to complete contention resolution under a contention based random access procedure.

5. The method according to claim 4, wherein said performing, by the UE, the BFR by re-initiating a random access procedure, comprises:
   re-initiating the random access procedure by using a BWP and beam as well as random access resource of a last initiated random access procedure, until a maximum quantity of random access procedures is reached or a BFR timer expires; or
   performing a beam quality measurement on a current BWP, re-selecting an SSB or CSI-RS, and re-initiating the random access procedure on the current BWP according to random access configuration under a beam corresponding to the SSB or CSI-RS; or
   changing to a specific BWP, performing a measurement on an SSB or CSI-RS on the specific BWP, selecting an SSB or CSI-RS with channel quality higher than a threshold, and re-initiating the random access procedure according to random access configuration under a beam corresponding to the SSB or CSI-RS, wherein the specific BWP is an initial BWP or a default BWP; or
   re-selecting an SSB and/or CSI-RS and its corresponding beam according to results of SSB or CSI-RS measurements on a plurality of configured BWPs, and re-initiating the random access procedure according to random access configuration under the beam corresponding to the SSB or CSI-RS, wherein when the SSB and/or CSI-RS is/are not on a current BWP, the UE re-initiates the random access procedure on a changed BWP where the SSB and/or CSI-RS is/are located.

6. A user equipment (UE), comprising:
a processor configured to read programs in a memory to perform the process of:
determining whether beam failure recovery (BFR) is required; and
a transceiver configured to receive and send data under control of the processor to perform the process of:
performing the BFR by initiating a random access procedure on a selected Band Width Part (BWP) when determining that the BFR is required, wherein the BWP is not changed in the random access procedure;
wherein said performing the BFR by initiating the random access procedure on the selected BWP, comprises:
selecting a beam according to channel quality on a plurality of configured BWPs, and the BFR is performed by initiating the random access procedure on a BWP where the beam is located;
wherein said selecting the beam according to channel quality on the plurality of configured BWPs, comprises:
performing measurements on Synchronization Signal Blocks (SSBs) and/or Channel State Information Reference Signals (CSI-RSs) on the plurality of configured BWPs, wherein different SSBs or CSI-RSs correspond to different beams; and
selecting a beam configured with contention free random access resource from beams that meet a channel quality requirement, and initiating the random access procedure on a BWP where the beam is located; when none of beams configured with contention free random access resource meets the channel quality requirement, selecting another beam that meets the channel quality requirement, and initiating the random access procedure on a BWP where the another beam is located.

7. The UE according to claim 6, wherein said performing the BFR by initiating the random access procedure on the selected BWP, further comprises:
initiating the random access procedure on an active BWP activated before beam failure, wherein when there is no contention free random access resource for BFR on the active BWP, the BFR is performed by initiating a contention based random access procedure; or
initiating the random access procedure on an active BWP activated before beam failure, wherein when there is contention free random access resource for BFR on the active BWP, the BFR is performed by initiating a contention free random access procedure on the active BWP; and when there is no contention free random access resource for BFR on the active BWP, the active BWP is changed to a default BWP configured with contention free random access resource and the BFR is performed by initiating the random access procedure on the changed default BWP.

8. The UE according to claim 7, wherein the default BWP configured with contention free random access resource comprises: an initial BWP, or a default BWP, or a BWP configured specially to perform BFR.

9. The UE according to claim 6, wherein the process further comprises:
performing the BFR by re-initiating a random access procedure when not receiving a Physical Downlink Control Channel (PDCCH) scheduling command with a Cell-Radio Network Temporary Identifier (C-RNTI) during configured time under a contention free random access procedure or failing to complete contention resolution under a contention based random access procedure.

10. The UE according to claim 9, wherein said performing the BFR by re-initiating a random access procedure, comprises:
re-initiating the random access procedure by using a BWP and beam as well as random access resource of a last initiated random access procedure, until a maximum quantity of random access procedures is reached or a BFR timer expires; or
performing a beam quality measurement on a current BWP, re-selecting an SSB or CSI-RS, and re-initiating the random access procedure on the current BWP according to random access configuration under a beam corresponding to the SSB or CSI-RS; or
changing to a specific BWP, performing a measurement on an SSB or CSI-RS on the specific BWP, selecting an SSB or CSI-RS with channel quality higher than a threshold, and re-initiating the random access procedure according to random access configuration under a beam corresponding to the SSB or CSI-RS, wherein the specific BWP is an initial BWP or a default BWP; or
re-selecting an SSB and/or CSI-RS and its corresponding beam according to results of SSB or CSI-RS measurements on a plurality of configured BWPs, and re-initiating the random access procedure according to random access configuration under the beam corresponding to the SSB or CSI-RS, wherein when the SSB and/or CSI-RS is/are not on a current BWP, the random access procedure is re-initiated on a changed BWP where the SSB and/or CSI-RS is/are located.

11. A non-transitory computer readable storage medium, wherein, the computer readable storage medium stores computer programs configured to cause a processor to:
determine that beam failure recovery (BFR) is required; and
perform the BFR by initiating a random access procedure on a selected Band Width Part (BWP), wherein the BWP is not changed in the random access procedure;
wherein said perform the BFR by initiating the random access procedure on the selected BWP, comprises:
selecting a beam according to channel quality on a plurality of configured BWPs, and the BFR is performed by initiating the random access procedure on a BWP where the beam is located;
wherein said selecting the beam according to channel quality on the plurality of configured BWPs, comprises:
performing measurements on Synchronization Signal Blocks (SSBs) and/or Channel State Information Reference Signals (CSI-RSs) on the plurality of configured BWPs, wherein different SSBs or CSI-RSs correspond to different beams; and
selecting a beam configured with contention free random access resource from beams that meet a channel quality requirement, and initiating the random access procedure on a BWP where the beam is located; when none of beams configured with contention free random access resource meets the channel quality requirement, selecting another beam that meets the channel quality requirement, and initiating the random access procedure on a BWP where the another beam is located.

* * * * *